Feb. 7, 1967  J. ZAREMBSKI  3,302,626
FLUID MACHINE
Filed June 10, 1964  2 Sheets-Sheet 1
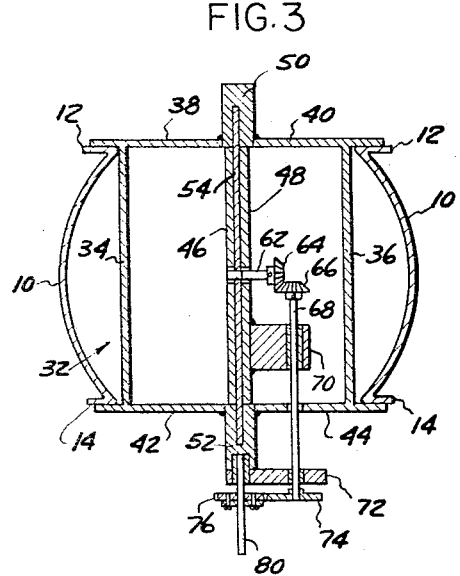
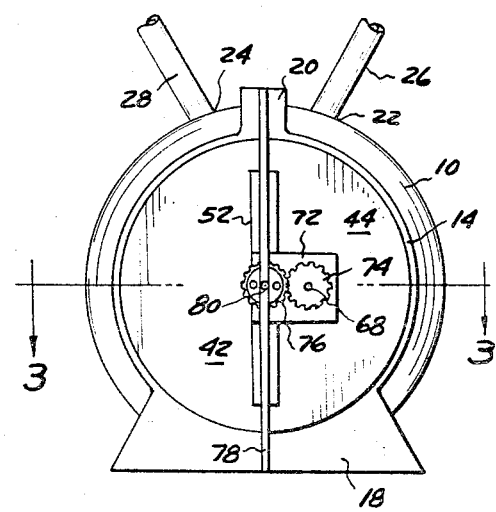
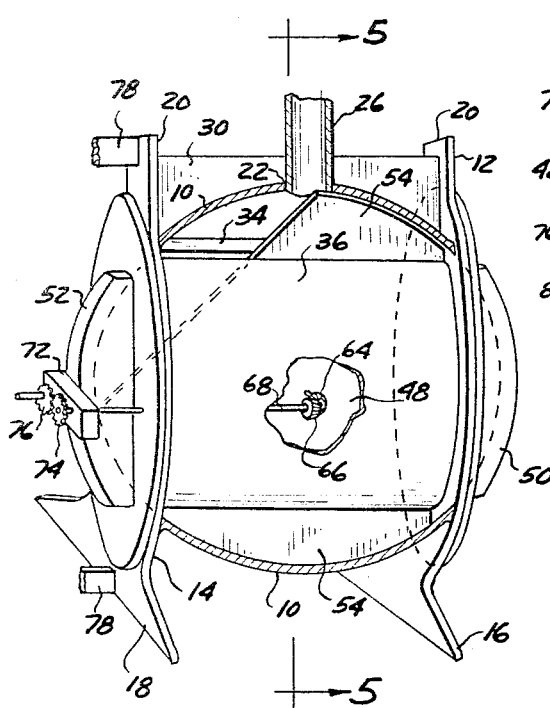
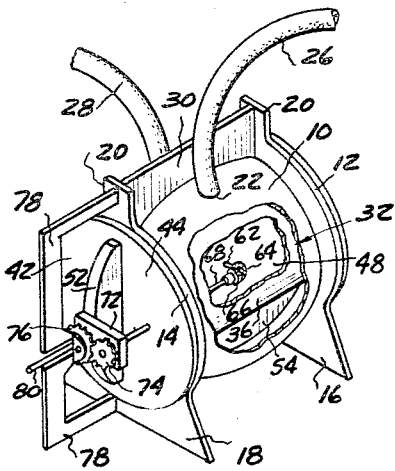
INVENTOR.
JEROME ZAREMBSKI
BY
ATTORNEY

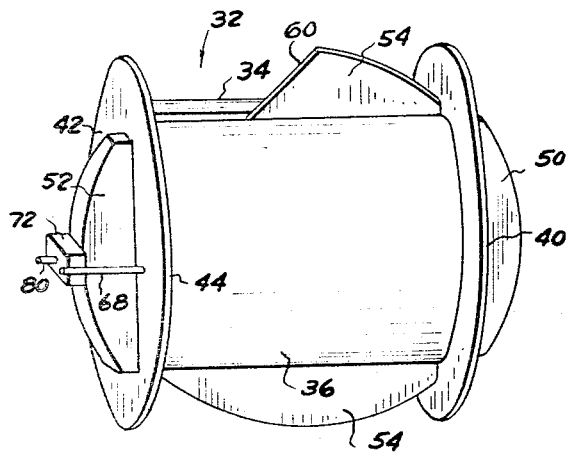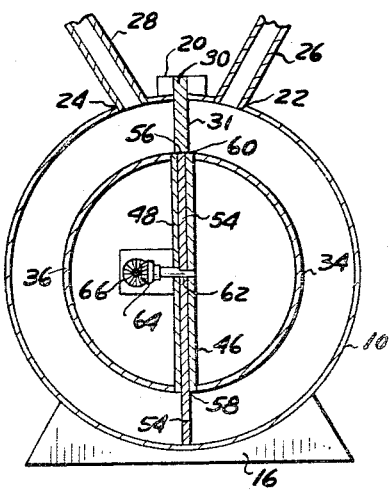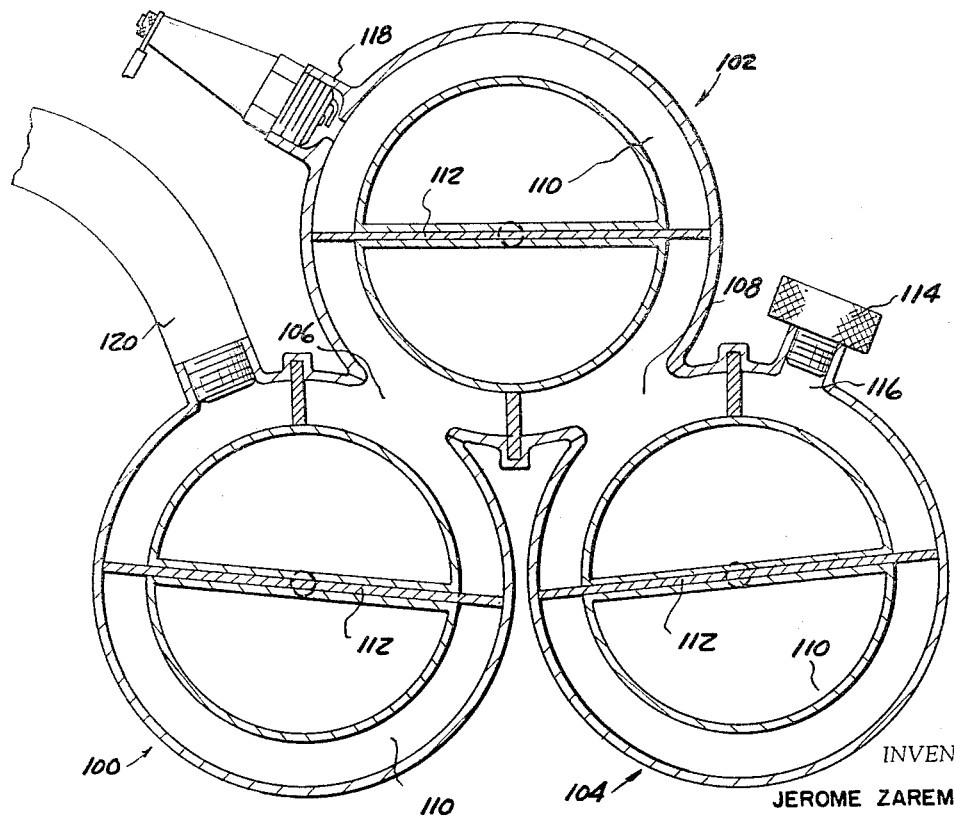

United States Patent Office 3,302,626
Patented Feb. 7, 1967

3,302,626
FLUID MACHINE
Jerome Zarembski, 13547 Roselawn,
Detroit, Mich. 48238
Filed June 10, 1964, Ser. No. 374,133
9 Claims. (Cl. 123—16)

This invention relates to a fluid machine of the rotary type wherein chambers of increasing and decreasing volumes are formed by vanes which extend between a rotor and a stator surrounding the rotor and move in timed relation to the rotation of the rotor, which rotation may occur as a result of the fluid pressure so the device acts as a motor, or as a result of external powering of the rotor, so that the device acts as a pump.

Since devices of this class are capable of use as either a motor or a pump, the general description of the invention will be made in terms of the motor mode of operation and the pump operation may be readily understood therefrom.

The present invention contemplates a device of this class wherein the rotor is symmetrically disposed within the stator and the opposing surfaces of the rotor and stator are both circularly symmetrical (either cylindrical or spherical). The chambers between the rotor and the stator are formed by a set of vanes which extend from the rotor and with stationary vanes attached to the stator. The stator vanes depend from the stator and make fluid-sealing contact with the surface of the rotor. The vanes which extend from the rotor are adapted to reciprocate in timed relation to the motion of the rotor so as to either extend therefrom and make sealing contact with the wall of the stator or to retract within the rotor. Their motion is such that, as the rotor points which carry the vanes pass the stator vanes, the rotor vanes are retracted so as to not interfere with the stator vanes.

As in all motors of this type, the vane configuration may be repeated any number of times about the interface between the rotor and stator so as to form a plurality of fluid chambers, however, the present invention has a particular embodiment wherein only one stator vane is used and a rotor vane is employed which may project from either side of the rotor. In this embodiment, described in detail in the subsequent specification, the rotor carries a single vane which is capable of extending from the rotor, in a radial direction, from either or both of two slots on diametrically-opposed lines on the rotor. This single-vane structure is supported within the rotor for rotation about an axis which constitutes a diameter of the cylinder. The plane of the vane thus cuts the rotor cylinder into two equal halves along lines on the surface of the rotor parallel to its axis. The single-rotor vane structure is caused to rotate about its axis in timed relation to the rotation of the rotor by suitable gearing which drives the rotor vane in accordance with the relative movement between the rotor and the stator. The rotor vane configuration is such that it always projects from one of the rotor sides sufficiently to make sealing contact with the opposed point on the stator. In fact there is one instance in the rotation where the rotor vane structure projects from both sides of the rotor and for an instant makes sealing contact with stator points on the opposed sides of the rotor. As the rotation continues, the vane begins to retract from one of the sides so as to open the chamber which previously existed there. The vane continues to extend from the other side for 180 degrees of rotation. Then it begins to retract while the vane extends from the opposite side.

The single-stator vane contacts the rotor at the vane exit slot on the rotor at such time as the vane at that point is completely withdrawn and the vane projected from the opposite side wherein it is in the middle of its extended position dwell.

Because of its rotation, the vane does not extend and retract perpendicular to the rotor surface but rather rotates in and out of position with one of its edges opening and closing. The rotor structure required to accommodate the single rotating vane of the structure takes the form of a pair of cylinder halves joined at their ends by seams radially outward of the rotating vane's extremities.

In order to conform to the rotor vane rotation, the stator employed in the single rotor vane embodiment has a spherical interior surface with a single fluid inlet and a single fluid outlet disposed on opposite sides of the stator vane. As fluid under pressure enters it fills a chamber formed between the rotor and stator surfaces and is bounded by the stator vane on one side and by the projecting rotor vane on the other side. The fluid pressure exerted against this rotor vane causes the rotor to turn so as to allow this chamber to expand. Simultaneously, the chamber formed between the other end of the rotor vane and the other side of the stator vane is contracting so as to expel fluid from the other port.

Rotation of the rotor vane is achieved in the preferred embodiment by a planetary gear which is rotatably supported on the rotor on an axis displaced from the central axis of the rotor, and orbits about a stationary gear fixed to the stator. The resulting rotation of the orbiting gear is drivingly connected to the rotor vane through a suitable gear train and causes the train to rotate in timed relation to the motion of the rotor.

In one particular application of the invention three of the single rotor vane devices are connected through their ports so that the output of the first device is fed to the second and the output of the second device is fed to the third. They are also connected by gearing so the rotors moved in timed relation to one another. The first device has input from a suitable carburator and acts to pump an explosive mixture into the chamber of this second device which acts as an explosion chamber. A spark plug set in the second device ignites this explosive mixture so as to power the rotation of the third device. The combustion products are allowed to escape to the atmosphere when rotor vane of the third device opens.

It is, therefore, seen that a primary object of the present invention is to provide a fluid device of the rotary type wherein expanding and contracting chambers are formed between rotor vanes which extend and retract from the rotor in timed relation to the rotation of the rotor, and stationary stator vanes which contact the surface of the rotor and make sealing contact therewith.

Another object is to provide such a structure wherein a single rotor vane is employed which may extend or retract from either of two slots formed on diametrically-opposed lines on the rotor in timed relation to the motion of the rotor.

A still further object is to provide such a device wherein the single rotor vane achieves its extension and retraction by rotating in a plane passing through the axis of the rotor.

A still further object is to provide an internal combustion engine formed of a plurality of these machines.

Other objects, advantages, and applications of the present invention will be made apparent from the following detailed description of a preferred embodiment of the invention. The description makes reference to the accompanying drawings wherein:

FIGURE 1 is a front perspective view of an embodiment of my invention, partially broken away for purposes of illustration;

FIGURE 2 is a side perspective view of my invention partially broken away for purposes of illustration;

FIGURE 3 is a cross-sectional view of the invention taken along lines 3—3 of FIGURE 4;

FIGURE 4 is an end view of the embodiment;

FIGURE 5 is a sectional view taken along lines 5—5 of FIGURE 2;

FIGURE 6 is a perspective view of the rotor employed with embodiment; and

FIGURE 7 is a semi-schematic representation of an internal combustion engine employing the units of the present invention.

Referring to the drawings, the preferred embodiment of my invention employs a stator member 10 which is spherical in shape and has a pair of truncated ends. The stator sphere is shown to be formed of a thin wall material such as a plastic. As a practical matter, the outer diameter of the stator 10 need not be spherical and can be formed in a shape consistent with the obtaining of a spherical internal surface. A pair of circular end plates 12 and 14 surround the edges of the circular apertures formed on either end of the stator 10 and act to support the stator on integral base plates 16 and 18. Along their upper edges 20 the end plates 12 and 14 are joined by a reinforcing member 30 which extends between and is disposed perpendicular to them.

The stator has a pair of ports 22 and 24 formed through to its top surface communicating with its internal diameter. These ports are connected to fluid lines 26 and 28 and act to convey fluid to and from the interior of the stator. The stator also has a single vane 31 formed as an extension of the member 30 and which extends from the interior surface of the stator 10. The vane 31 extends radially inward toward the axis which connects the two circular ends of the stator 10. Its lower surface is flat and makes sealing contact with a rotor generally indicated at 32 which is rotatably supported within the stator.

The rotor 32 is generally cylindrical in shape and is specifically formed of a pair of semi-cylindrical halves 34 and 36. Each of the halves 34 and 36 is formed with a semi-circular front and back end plate respectively shown at 38, 40, 42 and 44. The end plates 38, 40, 42 and 44 have circular edges which extend beyond the sides of the halves 34 and 36 and abut the stator end plates 12 and 14 so as to make fluid-sealing contact therewith and journal the rotor for rotation. The two halves 34 and 36 are sealed with side plates 46 and 48. Thus, the plate 46 combines with the rotor side 34 and the two end plates 38 and 42 to form an enclosed cylinder half, as does the plate 48, the rotor wall 36 and the two end plates 40 and 44. These two halves are joined externally of their end walls at each end by semi-circular plates 50 and 52. They are joined so that the plates 46 and 48 are parallel to one another but separated by a distance approximately equal to their thickness. This cavity between the plates 46 and 48 provides a housing for a rotor vane 54 which moves in this space. It is adapted to be extended or retracted from slots 56 and 58 formed along lines on dimetrically-opposed sides of the rotor 32 where the halves 34 and 36 join as can best be seen in FIG. 5.

The rotor vane 54 is generally circular, having a radius equal to that of the stator sphere 10. It has a flat 60 formed on one edge which subtends an arc equal to the arc subtended across the spherical stator by the outer diameter of the rotor. The rotor vane 54 is supported for rotation within the space formed between the two rotor halves 34 and 36 by a shaft 62 which is disposed on an axis perpendicular to that of the plates 46 and 48 and rotatably supported within the plates. The shaft 62 has a bevel gear 64 which is attached to a shaft 68 which extends perpendicularly to the shaft 62. The shaft 68 is journalled in a block 70 which is affixed to the side of the plate 48 and passes through an aperture formed in the end plate wall 44.

Externally of the rotor, the shaft 68 is journalled in another support block 72 which is attached to the plate 52. It carries a spur gear 74 on its outer end. This gear is in mesh with a fixed gear 76 which is disposed with its central line on the axis of the rotor 32. The gear 76 is supported by a pair of brackets 78 which extend from the upper and lower stator supports. These brackets 78 support the gear 76 with respect to the stator so that it does not rotate with the rotor. The center shaft of the rotor 80 which is connected to the plate 52, passes through an opening in the center of the gear 76, but does not contact it.

As the rotor 32 revolves about its axis, journalled in the stator end plates 12 and 14, the gear 74 orbits about the fixed gear 76 and causes its shaft 68 to rotate. This rotation is transferred through the shaft 62 to the rotor vane 54. Thus, the rotor vane 54 rotates about its axis in timed relation to the rotation of the rotor 32. The rotational position of the rotor vane 54 within the rotor determines whether it will project from one or both of the slots 56 and 58 so as to make sealing contact with the wall of the stator. The stator vane 54 is so shaped that as long as the flat 60 is not projecting from one of the slots 56 or 58, the edges of the vane 54 make sealing contact with the opposed surface on the interior wall of the stator 10.

For example, in FIGURE 5 the vane 54 is shown as being so rotated that the flat 60 is in line with the slot 56 formed on one side of the rotor. At this point the vane 54 projects from the other side so as to make full sealing contact with the interior wall of the stator. A 90 degree rotation of the rotor in the counter-clockwise direction as viewed in FIGURE 5 would rotate the vane 54 so that the flat 60 is totally within the rotor structure. Therefore, the vane 54 would make sealing contact with the interior stator wall on both of its sides. A further counter-clockwise rotation would cause the flat to begin to appear through the slot 58 so as to begin to withdraw the vane from that side and open the seal between the volumes on its opposed sides. When the vane has rotated 180 degrees out of the position shown in FIGURE 5, it will be completely withdrawn within the slot 58 and will be extending through the slot 56 so as to make sealing contact with the interior surface of the stator on that side. It should be noted that when one of the slots 56 or 58 passes the stator vane 31 the rotor vane 54 is completely withdrawn within that slot at that point.

Considering the action of the device as a fluid motor, fluid under pressure may be admitted through the inlet port 24 from hydraulic line 28. When the rotor is in the position illustrated in FIGURE 5, this fluid is contained in a chamber formed between the interior of the stator 10 and the exterior of the rotor 32 and bounded on its two sides by the stator vane 31 and the projecting end of the rotor vane 54. The pressure exerted on the vane 54 causes the rotor to rotate in a counter-clockwise direction, thereby expanding the fluid-containing chamber. As has been noted, this rotation causes one end of the rotor vane 54 to begin to project from the slot 56 but the vane does not seal off the chamber until the rotor has rotated to 90 degrees. At that point a new chamber is formed between this end of the rotor vane and the stator vane 31 and continued pressure is exerted on the rotor causing it to rotate. At the same time, the fluid beyond the other end of the rotor vane is pushed out of the fluid outlet 22 and the fluid line. This rotation of the rotor 32 provides an output motion of the shaft 80 which may be used to drive associated devices.

Using the device as a fluid pump the rotor 32 is turned through the shaft 80 and fluid introduced through the port 24 is forced out of the port 22 under pressure.

While the preferred embodiment which has beeen described employs a single rotor vane which projects from two points on the rotor so as to perform the function of two separate vanes, other embodiments might incorporate a larger number of vanes and an equivalent number of stator vanes. The configuration might also be altered by varying the manner of actuation of the rotor blades. In embodiments wherein the rotor blades are actuated in a direction perpendicular to the rotor surface, the stator might have a cylindrical interior chamber rather than a spherical one.

FIGURE 7 discloses an arrangement whereby three units of the type previously described are joined to one another and associated with auxiliary apparatus to form an internal combustion engine. The three units will be generally termed 100, 102 and 104. The inlet port of the unit 100 and the outlet port of the unit 102 comprise a single passage 106. Similarly, the inlet port of the unit 102 and outlet port of unit 104 comprise a single passage 108. Each of the units has a rotor 110 with a single rotor band 112 of the type described in the previous embodiments. Suitable means (not shown) are provided for gearing the rotors to one another so that the three will move in timed relation to one another. The unit 104 is equipped with a carburator 114 which connects its inlet port 116 to a supply of gas. Acting in the manner of a pump, the unit 104 provides the gaseous mixture under pressure to the unit 102. The mixture is ignited by a spark plug 118 fixed in the wall of the stator of the unit 102. Subsequent explosion provides the necessary forces which rotate the rotor of the unit 100 and the other two units through the aforementioned gearing. The exhaust product escapes to the atmosphere through exhaust line 120. In this manner the device operates as an internal combustion engine.

Having thus described my invention, I claim:

1. A fluid machine, comprising, in combination:
   a stator having a central aperture which is spherical in configuration and having a pair of opposed parallel circular apertures at opposite ends;
   a cylindrical rotor supported for rotation within said stator about the axis of said two circular apertures, said cylinder being formed of two halves separated by a plane which passes through the axis of said cylinder, said two halves being joined to one another along a pair of circular lines, one disposed at each end of the rotor cylinder, the ends of said two lines being joined by slots formed along the perimeter of the rotor parallel to the axis thereof and on diametrically opposed sides thereof;
   a single stator vane fixed to the stator and projecting radially inward therefrom so that its radially inward edge makes a fluid sealing contact with the cylindrical surface of the rotor;
   a rotor vane generally circular in shape with a radius corresponding to the radius of said central spherical aperture and a diameter at least as great as the length of the rotor cylinder, said rotor vane having a flat formed thereon along a chord having a length corresponding to the length of said rotor cylinder, and said rotor vane disposed within said stator so as to rotate about an axis perpendicular to the plane dividing said two rotor halves;
   a pair of spaced and parallel flat members disposed within the rotor and adapted to form a housing within which the rotor vane moves;
   a first gear fixed with respect to said stator;
   a second gear in mesh with said first gear and rotatably supported on said rotor for rotation about an axis parallel to and displaced from the central axis of said rotor, whereby said second gear orbits about said first gear as the rotor rotates;
   means connected to said second gear to said rotor vane so as to cause said vane to rotate about its axis in timed relation to the rotation of the rotor about its axis, whereby the surfaces of said vane extend through said two slots and move into fluid-sealing contact with the spherical surface of the stator and then retract into said slots in timed relation to the rotation of said rotor, one complete extension and retraction cycle occurring during each rotation of said rotor;
   and fluid ports formed in the stator on opposite sides of the stator vane.

2. A fluid machine, comprising, in combination:
   a stator having a central aperture which is spherical in configuration and having a pair of opposed parallel circular apertures at opposite ends;
   a cylindrical rotor supported for rotation within said stator about the axis of said two circular apertures, said cylinder being formed of two halves separated by a plane which passes through the axis of said cylinder, said two halves being joined to one another along a pair of circular lines, one disposed at each end of the rotor cylinder, the ends of said two lines being joined by slots formed along the perimeter of the rotor parallel to the axis thereof and on diametrically opposed sides thereof;
   a single stator vane fixed to the stator and projecting radially inward therefrom so that its radially inward edges makes a fluid sealing contact with the cylindrical surface of the rotor;
   a rotor vane generally circular in shape with a radius corresponding to the radius of said central spherical aperture and a diameter at least as great as the length of the rotor cylinder, said rotor vane having a flat formed thereon along a chord having a length corresponding to the length of said rotor cylinder, and said rotor vane disposed within said stator so as to rotate about an axis perpendicular to the plane dividing said two rotor halves;
   a pair of spaced and parallel flat members disposed within the rotor and adapted to form a housing within which the rotor vane moves;
   gear means for rotating said rotor vane about its axis in timed relation to the rotation of the rotor about its axis, whereby the surfaces of said vane extend through said two slots and move into fluid-sealing contact with the spherical surface of the stator and then retract into said slots in timed relation to the rotation of said rotor;
   and fluid ports formed in the stator on opposite sides of said stator vane.

3. A fluid machine, comprising, in combination:
   a stator having a central aperture which is spherical in configuration and having a pair of opposed parallel circular apertures at opposite ends; a cylindrical rotor supported for rotation within said stator about the axis of said two circular apertures, said cylinder having a pair of slots formed on diametrically-opposed sides of the cylinder parallel to the axis thereof;
   a single stator vane fixed to the stator and projecting radially inward therefrom so that its radially inward edge makes a fluid sealing contact with the cylindrical surface of the rotor;
   a rotor vane generally circular in shape with a radius corresponding to the radius of said central spherical aperture and a diameter at least as great as the length of the rotor cylinder, said rotor vane having a flat formed thereon along a chord having a length corresponding to the length of said rotor cylinder, and said rotor vane disposed within said stator so as to rotate about an axis perpendicular to the plane dividing said two rotor halves;
   a pair of spaced and parallel flat members disposed within the rotor and adapted to form a housing within which the rotor vane moves;
   a gear means for rotating said motor vane about its axis in timed relation to the rotation of the rotor about its axis, whereby the surfaces of said vane extend through said two slots and move into fluid-sealing contact with the spherical surface of the stator and then retract into said slots in timed relation to the rotation of said rotor;

and fluid ports formed in the stator on opposite sides of said stator vane.

4. A fluid machine, comprising, in combination:
a stator member;
a rotor member supported for rotation within said stator member; the space formed between the inner stator surface and the outer rotor surface being constant over their entire peripheries for each radial cross-section;
one fixed vane extending between the rotor and the stator making fluid-sealing contact between the two of them;
at least two movable vanes each of said vanes having a first perimetrical section corresponding to the surface of said stator, a second flat perimetrical section having a length coreresponding to said rotor member, each of said vanes having a diameter at least as great as said rotor member, and said vanes extending between the rotor and the stator and supported so as to rotate with the stator and to extend and retract between closed positions wherein they make fluid-sealing contact with both the rotor and the stator and retracted positions wherein they do not make fluid sealing contact with the rotor and the stator;
means for extending and retracting said movable vanes in timed relation with the rotation of said rotor;
and at least one fluid inlet port and at least one fluid outlet port disposed in said stator on opposite sides of fixed vane.

5. A fluid machine, comprising:
a stator;
a cylindrical rotor disposed for rotation within said stator, the space formed between the outer rotor surface and the interior stator surface being constant over the entire peripheries for each radial cross-section;
a stator vane projecting from said stator in a radial direction to make sealing contact with the surface of said rotor; a pair of slots formed in the surface of the rotor on diametrically-opposed sides;
a pair of flat and spaced members disposed within the the rotor to form a rotor vane housing;
a pair of rotor vanes, each of said vanes having a first perimetrical section corresponding to the interior surface of said stator, and a second flat perimetrical section having a length corresponding to said rotor member, each of said vanes having a diameter at least as great as said rotor member, and said vanes disposed within said rotor and operative to extend and retract through said slots so as to have their radially outer edges in sealing contact with the stator surface at such time as they are extended;
a fluid inlet port and a fluid outlet port disposed in said stator at opposite sides of said stator vanes;
and gear means disposed between the rotor and the stator so as to be rotated in timed relation to the rotation of the rotor and drivingly connected to said rotor vanes so as to cause said rotor vanes to extend and retract in timed relation to the rotation of the rotor so that each vane undergoes a complete motion cycle during one rotation of the rotor.

6. A fluid machine, comprising:
a stator;
a rotor disposed with said stator;
the space formed between the outer rotor surface and interior stator surface being constant over their entire peripheries for each radial cross-section;
a stator vane projecting from said stator in the radial direction to make sealing contact with the surface of the rotor;
a pair of slots formed in the surface of the rotor on diametrically-opposed sides;
a pair of flat and spaced members disposed within the rotor to form a rotor vane housing;
a rotor vane having a first perimetrical section corresponding to the interior surface of said stator and a second flat perimetrical section having a length corresponding to the length of said slots and said rotor vane rotatably supported within said rotor about an axis perpendicular to the axis of the rotor and operative upon rotation to extend and retract through said slots so as to move into and out of fluid-sealing contact with the stator surface;
a fluid inlet port and a fluid outlet port disposed within said stator at opposite sides of said stator vane;
and means for rotating said rotor vane about its axis so as to cause it to extend and retract through said slots in timed relation to the rotation of the rotor.

7. A fluid machine, comprising:
a stator;
a rotor disposed for rotation within said stator; the space formed between the outer rotor surface and interior stator surface being constant over their entire peripheries for each radial cross-section;
a stator vane projecting from said stator in the radial direction to make sealing contact with the surface of the rotor;
a pair of slots formed in the surface of the rotor on diametrically opposed sides;
a pair of flat and parallel members disposed within the rotor and adapted to form a housing communicating with said slots;
a pair of rotor vanes, each of said vanes having a first perimetrical section corresponding to the surface of said stator, and second flat perimetrical section having a length corresponding to said rotor slots, each of said vanes having a diameter at least as great as the length of said rotor member, and said vanes disposed within said rotor and operative to extend and retract through said slots so as to have their radially outward edges in fluid-sealing contact with the stator surface at such time as they are extended;
a fluid inlet port and a fluid outlet port disposed within said stator at opposite sides of said stator vanes;
and means for moving said rotor vanes between their extended and retracted positions in timed relation to the rotation of the rotor.

8. A fluid machine, comprising:
a stator;
a rotor disposed for rotation within said stator;
a stator vane projecting from said stator in the radial direction to make sealing contact with the surface of the rotor;
a pair of slots formed in the surface of the rotor on diametrically-opposed sides;
a pair of flat and parallel members disposed within the rotor to form a housing communicating with said slots;
a pair of rotor vanes, each of said vanes having a first perimetrical section corresponding to the surface of said stator, and a second flat perimetrical section having a length corresponding to said rotor slots, each of said vanes having a diameter at least as great as said rotor member, and said vanes disposed within said rotor and operative to extend and retract through said slots so as to have their radially-outward edges in fluid sealing contact with the stator surface at such time as they are extended;
a fluid inlet port and a fluid outlet port disposed within said stator at opposite sides of said stator vane;
and means for moving said rotor vanes between their extended and retracted positions in timed relation to the rotation of the rotor.

9. A fluid machine, comprising in combination:
a stator;
a rotor supported for rotation within the stator member, the volume of space formed between the inner diameter of the stator and the outer diameter of the rotor being constant over their entire peripheries for each radial cross-section;

at least one stator vane supported on the stator and extending radially toward said rotor and making fluid sealing contact with the surface of said rotor;

at least two rotor vanes, each of said vanes having a first perimetrical section corresponding to the surface of said stator, and a second flat perimetrical section having a length corresponding to said rotor member, each of said vanes having a diameter at least as great as said rotor member, and said vanes supported within said rotor in a housing associated with slots formed in the perimeter of said rotor, said rotor blades being adapted to move between an extended position, wherein their radially outer edges are in fluid sealing with said stator surface and a retracted position, wherein they are withdrawn from within their associated slots in the rotor surface;

means for extending and retracting said rotor vanes in timed relation with the rotation of said rotor;

and at least one fluid inlet port and one fluid outlet port disposed in said stator separated from one another by the stator vane.

References Cited by the Examiner

UNITED STATES PATENTS

| 814,018 | 3/1906 | Christie | 91—150 |
| 826,670 | 7/1906 | Klann | 91—150 |
| 1,773,635 | 8/1930 | Simmons | 123—8 |
| 2,373,304 | 4/1945 | Garbeth | 123—16 |

FOREIGN PATENTS 513,450  10/1939  Great Britain.

MARK NEWMAN, *Primary Examiner.*

SAMUEL LEVINE, CARLTON R. CROYLE,
*Examiners.*

A. S. ROSEN, F. T. SADLER, *Assistant Examiners.*